March 21, 1961 E. G. ALLEN 2,976,012
TURBINE OVERSPEED PROTECTIVE SYSTEM
Filed Feb. 19, 1959
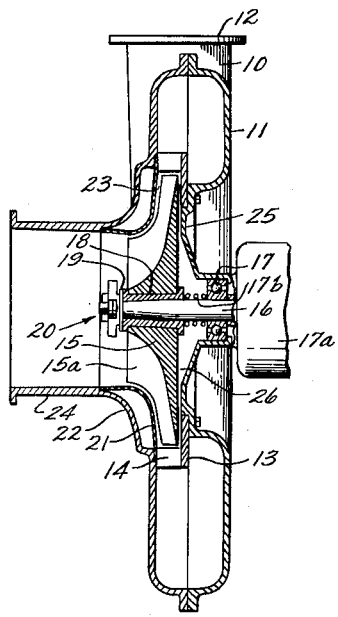
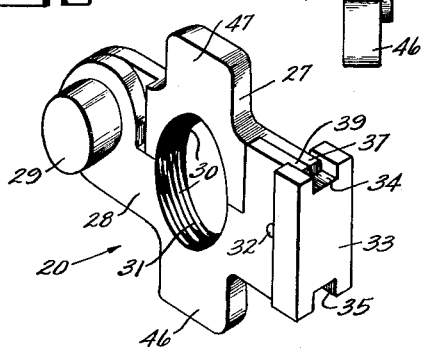
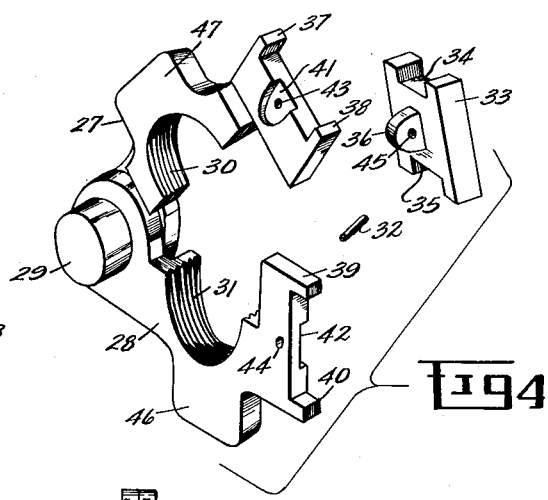
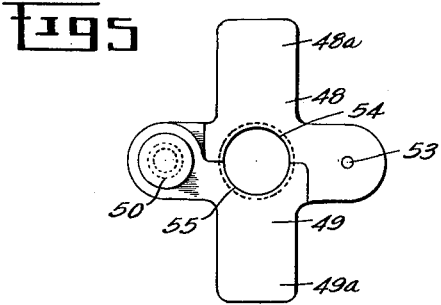
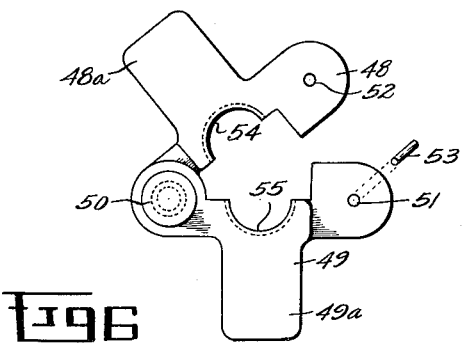
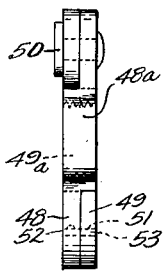
INVENTOR.
ELY G. ALLEN
BY
Lawrence G. Norris
ATTORNEY—

_United States Patent Office_

2,976,012
Patented Mar. 21, 1961

2,976,012

TURBINE OVERSPEED PROTECTIVE SYSTEM

Ely George Allen, Lynn, Mass., assignor to General Electric Company, a corporation of New York Filed Feb. 19, 1959, Ser. No. 794,412

9 Claims. (Cl. 253—52)

My invention relates to overspeed protective systems for fluid turbines.

My invention has particular application to gas turbines such as, for instance, air and hot gas turbines which are used in aircraft to drive accessories such as generators and the like. Such turbines may derive their power from self-contained gas generating systems or from air bled from the compressor of a jet engine and ducted to the turbine. Turbine drives of this general type are usually provided with speed control systems which serve to regulate the speed of the unit at some preselected level. In addition, a secondary or emergency overspeed trip system is usually provided in order to shut the unit down in the event of a malfunction in the primary speed regulating system.

It is usually the function of the secondary control to shut the unit down without damage to the unit itself. In the event of failures in both the primary and secondary speed control systems, however, the turbine wheel speed may reach dangerously high levels, such as to cause disintegration of the turbine wheel and other rotating parts. Because of the difficulty of containing fragments of the failed elements within the unit casing in the event of a failure of the type just described, such a failure can cause damage to equipment located in the vicinity of the turbine unit.

In recent years, therefore, it has been considered increasingly desirable and in some cases a requirement for aircraft accessory turbine equipment to provide for a failure sequence within the unit itself which allows containment of all parts within the turbine unit. In some cases this characteristic may serve as the sole overspeed protective system, but more generally it is to be combined with a conventional secondary control which is capable of shutting the unit down without damage to the unit in the event of a failure in the primary control system.

In view of the foregoing, it is an object of my invention to provide an improved overspeed control system for fluid turbines.

It is another object of my invention to provide an improved overspeed control system for fluid turbines in which certain elements in the turbine are caused to fail in a preselected manner such that the unit is shut-down without the escape of any elements from the turbine casing.

In carrying out these and other objects of my invention I provide, in one embodiment thereof employing a radial flow turbine, a releasable nut threaded or otherwise suitably secured to the turbine shaft to restrain the turbine wheel against axial movement. The nut is formed of a pair of hinged elements secured together by a shear pin which is caused to fail at a preselected speed in excess of normal operating speed to release the hinged elements, allowing them to rotate about their hinged connections to release the nut from the shaft. The wheel is then caused to move axially out of the path of the motive fluid either by means of the pressure differential across the wheel or by means of a mechanical force generating element such as a spring to remove the driving torque from the wheel. In order to maintain aerodynamic efficiency during normal operating conditions, I provide an inner shroud member extending adjacent the turbine wheel. The shroud member is relatively fragile in construction and is secured to an outer more rigid casing member such that the shroud is permitted to disintegrate or collapse as the turbine moves axially out of the stream of the motive fluid, the outer more rigid casing member preventing the escape of the turbine wheel from the casing. The inner shroud member also serves the purpose of dissipating a certain portion of the energy stored in the turbine wheel as the turbine moves axially out of the stream of the motive fluid.

Other objects and advantages of my invention will be apparent from the following description taken in connection with the accompanying drawings in which:

Fig. 1 is a cross-sectional view of an air turbine drive unit embodying my invention;

Figs. 2, 3 and 4 are illustrations of the one form of releasable nut which I employ in the embodiment of Fig. 1;

Figs. 5, 6 and 7 are illustrations of an alternate form of releasable nut configuration.

Referring now in particular to Fig. 1, there is shown an air turbine drive unit such as may be employed to drive electrical generators and the like in aircraft. The turbine comprises an outer casing 10 having formed therein a scroll portion 11 and an inlet connection 12 which is connectible to a suitable source of motive fluid such as compressed air or the like. Mounted in the turbine casing is a diaphragm 13 which includes a series of vanes or partitons 14 which form the inlet nozzles to the turbine.

A radial inflow turbine wheel 15, having airfoil portions 15a thereon, is mounted in the turbine casing 10 on a shaft 16, which is in turn rotatably supported in suitable bearings 17 located in a bearing housing 17a. In the particular embodiment shown, the shaft 16 is tapered toward its outer end and the turbine wheel 15 is mounted on the shaft by means of a bushing 18, the bushing 18 being permanently secured to and forming a part of the turbine wheel. The turbine wheel 15 including the bushing 18 is mounted against axial movement on the shaft 16 by means of a lockwasher 19 and a nut 20 which is threaded on to the end of the shaft 16.

Mounted within the turbine casing 10 is an inner shroud member 21 which is of relatively light or fragile construction in comparison to a more rigid outer casing portion 22 which extends outside and adjacent the shroud. The inner shroud member 21 minimizes the clearance space 23 adjacent the turbine wheel to maintain aerodynamic efficiency of the turbine under normal operating conditions as will hereinafter be explained.

Under normal operating conditions compressed air flows to the turbine 15 through the inlet connection 12, the scroll 11 and the nozzles 14. The air flows through the turbine in a radially inward direction and into an exhaust duct 24. The turbine casing 11 includes a back plate portion 25 which runs adjacent the back surface of the turbine wheel and forms a clearance space 26 therewith. It will be appreciated that the air in the clearance space 26 is essentially stagnant when compared to the velocity of the air on the opposite side of the turbine wheel so that the static pressure in the space 26 will be considerably higher than the static pressure on the opposite side of the wheel. This pressure differential produces a force on the turbine wheel tending to force it outward in the direction of the exhaust against the restraining force created by the nut 20.

The details of the nut 20 are shown with greater particularity in the illustration of Figs. 2, 3 and 4 and comprise elements 27 and 28 which are rotatably mounted on a shaft or pin 29 so as to be hinged together relative to each other at one end. The elements 27 and 28 include internally threaded portions 30 and 31 respectively which, when placed adjacent to each other as shown in Fig. 2, form a continuous internally threaded surface. The elements 27 and 28 are secured together at a point opposite the hinged end by means of a lug 33, which is held in place by a shear element, such as a pin 32. The lug 33 includes slotted portions 34 and 35 and a projecting portion 36. The elements 27 and 28 are provided with projecting portions 37, 38, 39 and 40 which, when aligned as shown in Fig. 2, mate with the slots 34 and 35 as shown. The elements 27 and 28 are also provided with depressions 41 and 42 which are aligned when the elements are in the position shown in Fig. 2 and which mate with the projection 36 on the lug 33.

Thus, when the elements 27 and 28 are rotated about the hinged connection 29 to the position shown in Fig. 2 and the lug 33 is moved into place as shown, the elements 27 and 28 are locked into position by engagement of the projection 36 with the apertures 41 and 42 and by engagement of the projections 37, 38, 39 and 40 with the slots 34 and 35.

The lug 33 is secured in place by means of a shear element, such as a shear pin 32 which extends through aligned apertures 43 and 44 in the elements 27 and 28 and 45 in the lug 33. The shear pin 32 may be secured in place in any suitable manner such as by peening over its ends after it has been inserted in place. With elements 27 and 28 secured together by the lug 33 as shown in Fig. 2, the threaded portions 30 and 31 are aligned with each other to form a continuously threaded cylinder such that the complete assembly 20 is equivalent in function to a conventional nut formed of a single element.

As has been previously stated, the nut 20 is threaded onto the shaft 16 to bear against the turbine wheel 15 through the lock washer 19. In operation, that is with the turbine wheel rotating, a centrifugal force is generated by the lug 33, placing the pin 32 under a shear stress. The magnitude of this stress is selected such that at normal speeds, it is within the permissible operating limits dictated by the material of the pin 32, the operating temperature and other pertinent considerations.

The speed of the turbine wheel 15 is normally regulated to the preselected level by means of a suitable primary control system, which is not shown but which may utilize a throttle valve or other fluid flow regulating means situated upstream of the flange 12 in the ducting leading to the turbine. In a typical configuration, the position of the throttle valve, and hence the flow rate of air to the turbine, is regulated by a speed governor driven by the turbine 15, usually through suitable reduction gearing.

In addition to the primary control system just described, a turbine drive unit of the type shown is usually provided with a secondary control system which acts to shut off the supply of air to the turbine in the event of a malfunction in the primary control system. It is usually the function of the secondary control to shut the unit down without damage to the unit itself and the secondary control would usually be provided with an automatic reset feature which would allow the turbine to be re-started once the failure in the primary control had been cleared.

The philosophy of my invention is somewhat different from that just discussed in that I allow certain elements in the turbine unit to go through failure in a preselected sequence, thus permitting a limited amount of damage to the turbine unit but avoiding damage to surrounding equipment. In carrying out this philosophy, I select a failure stress level for the shear pin 32 which is achieved at a preselected speed in excess of normal operating speed but below the speed at which failure of any of the other rotating components of the turbine unit would normally occur.

Thus, in the event of failures in both primary and secondary control systems, or in the primary system alone in the event no secondary system is provided, the turbine wheel becomes uncontrolled and its speed increases rapidly. As the speed of the turbine wheel increases, the centrifugal force generated by the lug 33, and hence the shear stress in the pin 32, increases as a function of the increasing speed. When the shear stress in the pin 32 reaches and exceeds the failure level, the pin fails in shear and releases the lug 33, which moves radially outward in response to the centrifugal force generated on it.

The removal of the lug 33 from the nut 20 releases the unhinged ends of the elements 27 and 28 allowing these elements to pivot about the pin 29, thereby releasing the nut from the shaft 16. The elements 27 and 28 are caused to pivot outwardly by the centrifugal force generated on them. The centrifugal force on the elements 27 and 28 may be increased by providing projecting portions 46 and 47 on these elements. The turbine casing wall 22 and exhaust portion 24 are of sufficient strength to contain the lug 33 and the elements 27 and 28 within the casing at the failure speed.

Once the nut 20 has been released from the shaft 16, the turbine wheel is free to move axially along the shaft 16 in the direction of the exhaust duct 24. The pressure differential existing across the turbine wheel therefore forces the turbine wheel outwardly along the shaft in the direction of the exhaust casing. As the turbine wheel 15 moves into the exhaust duct, it comes into contact with the relatively thin shroud member 21. The shroud 21 is sufficiently fragile such that it is incapable of preventing axial movement of the wheel when the wheel is rotating at speeds in the vicinity of the failure speed of the nut 20.

Thus, the shroud 21 is disintegrated by the rotational and axial movement of the wheel 15 such that the wheel is permitted to move axially until it comes into contact with the casing wall 22. As the wheel moves into contact with the wall 22, the airfoil portions 15a thereon are moved out of the path of the incoming motive fluid entering the turbine through the inlet nozzles 14, so that driving torque is removed from the wheel.

The wall portion 22 is of sufficient structural integrity to contain the turbine wheel until the energy stored in the wheel is dissipated by friction and windage and the wheel comes to a stop. Thus, the driving torque is removed from the turbine and the turbine is brought to a stop without a catastrophic failure or damage to surrounding equipment.

It will be apparent that the turbine wheel 15 may be moved axially out of the motive fluid stream by means other than the pressure differential across the wheel. Thus, I have shown spring means 17b mounted on the shaft 16 and extending between the wheel 15 and the bearing 17. The spring 17b is under compression such that it exerts an axial force on the wheel to move it out of the motive fluid stream upon release of the nut 20. I have found, however, that in one radial inflow turbine configuration embodying my invention, the pressure differential alone was sufficient to cause the required axial movement of the wheel upon release of the nut 20.

Referring now to Figs. 5, 6 and 7 I show an alternative releasable nut structure which comprises elements 48 and 49 hinged together at one end by means of a hinge pin 50. The elements are provided with cylindrical holes 51 and 52 at their opposite ends, the holes being positioned so as to be brought into alignment when the elements are moved to the position shown in Figs. 5 and 7. The elements 48 and 49 may be secured together by means of a shear pin 53 which may be inserted into the aligned holes 51 and 52 and peened over at its ends or otherwise suitably secured in place.

The elements 48 and 49 are provided with internally threaded sectors 54 and 55 which mate together to form a continuously threaded cylindrical surface capable of functioning in the same manner as an internally threaded nut formed of a single element. When fully assembled with the shear pin 53 in place, the nut is secured to the shaft 16 in the same manner as the nut 20.

At a preselected excess speed, the shear pin 53 is caused to fail by reason of the centrifugal force developed by the lugs 48a and 49a. Failure of the shear pin 53 allows the elements 48 and 49 to rotate about their hinged connection and release the nut from the shaft. The release of the nut permits axial movement of the wheel 15 in the same manner as described above in connection with the description of the configuration of Figs. 2, 3 and 4.

It will be noted that in the structure of Figs. 5 through 7, the elements 48 and 49 are secured in the closed position by the shear pin 53, whereas in the configuration shown in Figs. 2 through 4, the elements 27 and 28 are secured in the closed position by the lug 33, which is then in turn secured by the shear pin 32. Thus, with the configuration of Figs. 5 through 7, the forces which tend to expand or open the nut as it is threaded on the shaft 16 are absorbed directly by the shear pin 53, thereby placing it in a prestressed condition. In the configuration of Figs. 2 through 4, however, the spreading or opening force is absorbed by the lug 33, rather than by the pin 32, thus leaving the pin 32 in an unstressed condition when the turbine is not operating. Since the magnitude of the spreading force varies with tolerances and a number of other variables, and since this variation, when transmitted to the shear pin, causes a variation in the speed at which the pin fails, I prefer the releasable nut configuration of Figs. 2 through 4, wherein this variable is eliminated. It has been found, however, that the configuration of Figs. 5 through 7 will perform satisfactorily if the dimensional tolerances and other critical variables affecting spreading force magnitude are held within the limits corresponding to the acceptable variation in the failure speed of the nut.

It will be apparent from the foregoing that various other configurations of releasable fastening means will occur to those skilled in the art. It will also be appreciated that various modifications and changes may be made in the arrangements shown and described herein without departing from the true scope and spirit of my invention as defined in the appended claims.

What I claim as new and desire to secure by Letters Patent is:

1. In a fluid turbine comprising a radial flow turbine wheel mounted on a shaft, an overspeed protective system comprising releasable fastening means securing said turbine wheel against axial movement on said shaft, means responsive to an overspeed condition for releasing said releasable fastening means, whereby said turbine wheel is permitted to move axially along said shaft, and means for exerting an axial force on said turbine wheel in a direction to move it along said shaft and out of the path of the incoming motive fluid.

2. An overspeed protective system for a fluid turbine comprising a radial flow turbine wheel mounted on a shaft, means for directing a motive fluid through said turbine wheel in a radial direction, releasable securing means securing said turbine wheel against aial movement on said shaft, means for releasing said securing means at a preselected overspeed condition to permit axial movement of said turbine wheel, said releasing means comprising a securing element and means placing said securing element under a stress, the level of which is a function of the speed of said turbine wheel, whereby said securing element is caused to fail at a preselected speed magnitude to release said securing means from said shaft and permit axial movement of said turbine wheel, and means for exerting an axial force on said turbine wheel in a direction to move it along said shaft and out of the path of the incoming motive fluid.

3. An overspeed protective system for a fluid turbine comprising a radial flow turbine wheel mounted on a shaft, means for directing a motive fluid through said turbine wheel in a radial direction, releasable securing means securing said turbine wheel against axial movement on said shaft, speed responsive means for releasing said securing means at a preselected overspeed condition to permit axial movement of said turbine wheel, means for exerting an axial force on said turbine wheel in a direction to move it along said shaft and out of the path of the incoming motive fluid, an outer casing member of sufficient strength to limit the amount of axial movement of said turbine wheel and contain it within said casing, and an inner shroud member mounted in said outer casing and extending adjacent said turbine wheel and being relatively fragile such that it is incapable of preventing axial movement of said turbine wheel at the rotational speed at which said securing means is released from said shaft.

4. Apparatus as set forth in claim 3 in which said axial force exerting means comprises spring means urging said turbine wheel in an axial direction against said releasable securing means.

5. In an overspeed protective system for a fluid turbine including a radial flow turbine wheel mounted on a shaft, means releasably securing said turbine wheel against axial movement on said shaft comprising a pair of internally threaded elements hinged together at one end, means securing said elements together at the ends opposite said hinged ends so as to form an internally threaded nut, means for releasing said securing means at a preselected overspeed level of said turbine wheel, whereby said hinged elements are rotated by centrifugal force about their hinged connection to release said nut from said shaft, thereby permitting said turbine wheel to move axially along said shaft, and means for exerting an axial force on said turbine wheel in a direction to move it along said shaft and out of the path of the incoming motive fluid.

6. Apparatus as set forth in claim 5 wherein said releasing means comprise a securing element together with means placing said securing element under a stress which varies in magnitude as a function of the speed of said turbine wheel, the stress level being selected so that said securing element is caused to fail at said preselected overspeed level to release said hinged elements.

7. An overspeed protective system for a fluid turbine comprising a radial flow turbine wheel mounted on a shaft, means for directing a motive fluid through said turbine wheel in a radial direction, means for exerting an axial force on said turbine wheel in a direction to move it along said shaft and out of the path of said motive fluid, and a releasable nut securing said turbine wheel against axial movement along said shaft, said releasable nut comprising a pair of internally threaded elements hinged together at one end, means securing said elements together at the ends opposite said hinged end to form an internally threaded nut, said securing means including a securing element together with means placing a stress on said securing element of a magnitude which is a function of the speed of said turbine wheel, the stress level being selected such that said securing element is caused to fail at a preselected overspeed level of said turbine wheel to release said securing means and allow said hinged elements to pivot about their hinged connection and release said nut from said shaft, thereby permitting said turbine wheel to move axially along said shaft and out of the path of the incoming motive fluid.

8. An overspeed protective system for a fluid turbine comprising a radial flow turbine wheel mounted on a shaft, means for directing a motive fluid through said turbine wheel in a radial direction, means for exerting an axial force on said turbine wheel in a direction to move it along said shaft and out of the path of said motive fluid, and a releasable nut securing said turbine wheel against axial movement on said shaft, said releasable nut comprising a pair of internally threaded elements hinged together at one end, means securing said elements together at the ends opposite said hinged ends to form an internally threaded nut structure, said securing means comprising a lug having locking means engageable with the unhinged ends of said hinged elements to secure them together, and a shear pin extending through said hinged elements and said lug to secure said lug in place, said pin being placed under a shear stress by the centrifugal force generated by said lug upon rotation of said turbine wheel, the diameter of said shear pin being selected to allow failure of said pin at a preselected rotational speed of said turbine, thereby releasing said lug from said hinged elements to release said nut from said shaft and permit said turbine wheel to move axially out of the path of the incoming motive fluid.

9. An overspeed protective system for a fluid turbine comprising a radial flow turbine wheel mounted on a shaft, means for directing a motive fluid through said turbine wheel in a radial direction, means for exerting an axial force on said turbine wheel in a direction to move it along said shaft and out of the path of said motive fluid, and a releasable nut securing said turbine wheel against axial movement along said shaft, said releasable nut comprising a pair of internally threaded elements hinged together at one end, means securing said elements together at the ends opposite said hinged ends to form an internally threaded nut structure, said securing means comprising a shear pin extending through the unhinged ends of said hinged elements to secure them together, said shear pin being subjected to a shear stress by the centrifugal force generated by said hinged elements upon rotation of said turbine wheel, the diameter of said shear pin being selected to allow failure of said pin at a preselected rotational speed of said turbine, whereby said hinged elements are released from said shaft and said turbine wheel is permitted to move axially out of the path of the incoming motive fluid.

References Cited in the file of this patent

UNITED STATES PATENTS

| | | |
|---|---|---|
| 810,955 | Lund | Jan. 30, 1906 |
| 1,167,018 | Pyle | Jan. 4, 1916 |
| 1,506,111 | Crozet-Fourneyron | Aug. 26, 1924 |
| 1,510,492 | Caron et al. | Oct. 7, 1924 |
| 1,586,203 | Kiester | May 25, 1926 |
| 2,377,581 | Shaffrey | June 5, 1945 |

FOREIGN PATENTS

| | | |
|---|---|---|
| 607,293 | France | Mar. 23, 1926 |